June 29, 1965     C. B. GWYN, JR     3,191,276
METHOD OF MAKING COMPOSITE ELECTRICAL CONTACT BODIES
Filed Nov. 22, 1961     2 Sheets-Sheet 1
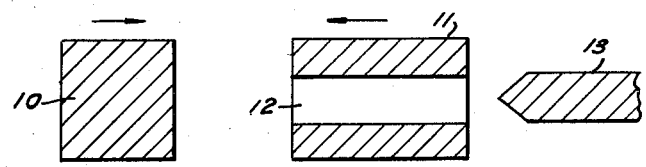
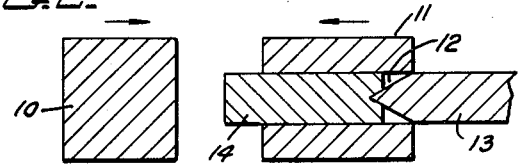
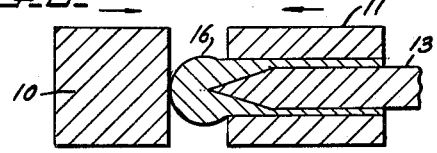
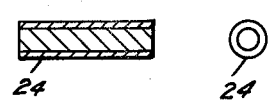
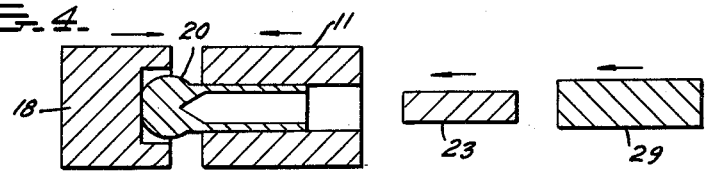
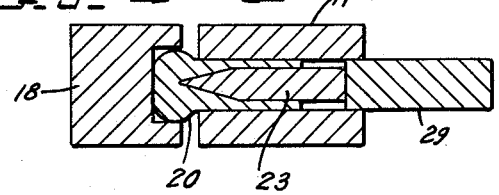
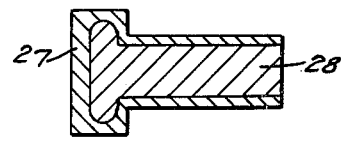
INVENTOR.
CHILDRESS B. GWYN, JR.
BY
OSTROLENK, FABER, GERB & SOFFEN
ATTORNEYS

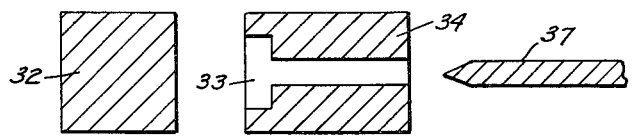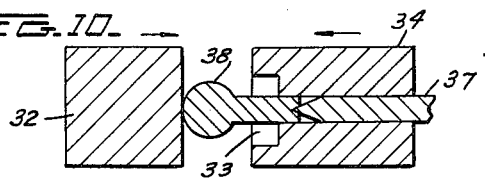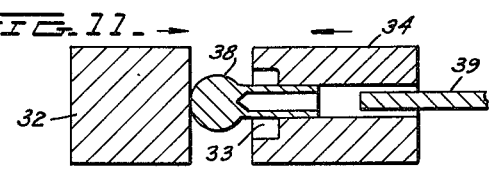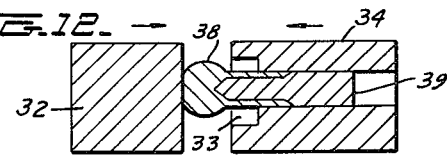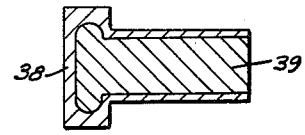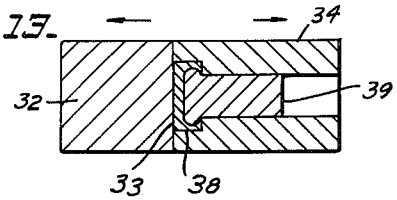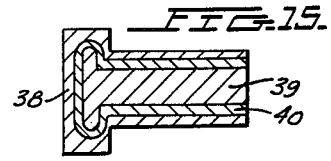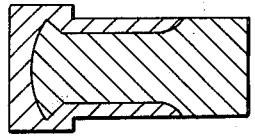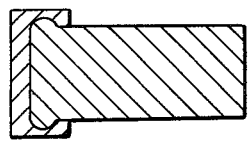

United States Patent Office

3,191,276
Patented June 29, 1965

3,191,276
METHOD OF MAKING COMPOSITE ELECTRICAL
CONTACT BODIES
Childress B. Gwyn, Jr., Export, Pa., assignor, by
mesne assignments, to Talon, Inc., a corporation of
Pennsylvania
Filed Nov. 22, 1961, Ser. No. 154,205
4 Claims. (Cl. 29—155.55)

This invention relates to electrical contacts and to methods of fabrication thereof.

This application is a continuation-in-part of application Serial No. 856,538, filed December 1, 1959, and now abandoned, by Childress B. Gwyn, Jr., the inventor herein.

One object of the present invention is to provide an electrical make and break contact assembly having a working face of a desired composition and being integrally united to a backing or body portion of dissimilar composition, preferably of less expensive material. The composite assembly due to its unique construction will be capable of functioning more efficiently and less expensively than contacts known heretofore, such as those produced in the form of a solid body of contact material, or those produced by brazing, "puddling," or the like.

A further object is to produce an electrical contact of superior operating characteristics at normal ambient and elevated temperatures.

Still another object, as indicated, is to produce a sheathed, clad, and/or faced contact member at a substantially lower cost than has heretofore been possible, by substantially reducing the amounts of expensive materials required for a satisfactory contact assembly.

Other objects will be apparent from the drawings and detailed description which follows.

Accordingly, the present invention provides a contact working face of desired composition, integrally bonded to a metal backing. The contact may be provided with only the working facing of the desired composition, or the finished element may comprise a facing plus a cladding or sheathing of the desired composition, over a portion or the entire surface area of the metal backing.

The method herein contemplated utilizes a support or rivet backing of some base metal such as copper, and, as will become apparent hereinafter, serves to unite by simultaneous heading, coining, extrusion and bonding thereto in desired locations and required amounts, the desired compositions of other materials.

According to present practice most rivet type contacts for electrical make and break services are made by fabricating not only the contact working face but also the entire contact body, including the shank, of one material, for example silver. Others of so called composite types are made by melting or fusing a lower melting point contacting facing to a higher melting point non-alloying base such as steel. Such melting or fusing methods are shown, for example, in U.S. Patents No. 2,049,771 and No. 2,199,240. Still other prior art methods utilize welding or laminating to accomplish construction of contacts clad with a facing of a contact material and a backing of another material. Still other techniques known heretofore employ a punch press to make a contact assembly of a pre-formed body and a pre-formed rivet, and include the placing of the pre-formed rivets in a recess in the contact body, and separately compressing the contact tips about the heads of the pre-formed rivets; finally cutting such formed segments from a main copper bar body member.

Prior art methods such as the aforesaid often have the disadvantages, however, of diffusion of unwanted materials into or through the working contact face, or are weak mechanically and inferior in frequently having lowered conductivity and/or localized sections highly resistant to the flow of electrical currents. In any event, they are more costly and exacting in their application than the methods of the present invention, and frequently the end product varies widely in quality from lot to lot, and even piece to piece.

The above disadvantages are overcome by the present invention which provides a structure in which only the working surface is of the desired contact material, controllable in its location and thickness to give optimum ratios of cost and wear. The contact material face has a desired backing formed integral with and/or within it, thus allowing the locating and attaching of the resultant contact assembly in an electrical circuit in such manner as to insure dependable and efficient operation as required over long periods of time. Moreover, by the employment of a less expensive body material such as, for example, steel or copper for the greater part of the contact body, the over-all cost is materially reduced.

It has also been suggested heretofore in such widely divergent fields as the production of poppet valves and the like to pre-form a thimble or hollow body in a single operation and subsequently place a stem or rod also pre-formed therein and to induce the mechanical flow of the thimble or hollow body over and around said stem or rod by an uncritical application of pressure alone to induce an assembly held together solely by mechanical means. The end product thus obtained is, however, unsuitable for electrical contact purposes. Not only is the product weak, electrically and mechanically, but it is subject to incorporation and infiltration of contaminants at the resulting interfaces, promoting corrosion, deformation and separation under the high electrical arcing temperatures often present in electrical contacts, as well as causing electrolytic action between the component elements. Further, the over-all head thicknesses of the mechanical assemblies produced by the aforesaid method are not such as would be practicable in electrical contacts; total head thicknesses of many electrical contacts being, of necessity, of about 0.008 inch to 0.015 inch. As is evident, such mechanical assemblies do not result in alloying and interbonding of contact facing materials and the main body of the support backing over the entire area of interfacial contact between the component elements. By the process of the present invention, such interbonding and alloying is not only accomplished, however, but the breadth or thickness of the head of the finished article itself may be of any desired dimension; and the relative thickness of the components therein may also be controlled within very wide limits to suit not only technical but economic considerations as well; objectives unobtainable heretofore with or without the advantages of production of a finished contact assembly in a single unit from raw stock in one continuous movement and operation as proposed herein. Further, the present process obviates the hot forging to finished dimensions of the product contacts and permits, as indicated, the production of all manner of shapes, sizes and combinations of materials difficult or impossible of fabrication heretofore.

Thus, the present invention contemplates the production of contacts for electrical make and break services of the rivet type by fabrication in a single apparatus of two or more component materials in rod or wire form, simultaneously forming these two, in one operation, into an integral finished form. Also simultaneously, there is obtained an alloying or bonding of the interfaces of the component elements by deformation of the two or more different materials at or beyond their elastic limits, in a range of pressures and at such forced rates of movements of the two or more components as to produce momentary but effective generation of a heating and/or scrubbing or wiping action sufficient to effect facial intermetallic bonding, alloying or interlocking of the mating faces of the two or more component materials.

This integration and bonding of the component interfaces is accomplished herein at ambient and normally at temporarily elevated temperatures; an elevated pressure of at least 2000 pounds per square inch (p.s.i.); and within a period as short as feasible, not in excess of 10 seconds, preferably within two seconds or, most desirably, as little as 0.25 second after the last of the component rods or wires used to produce the product contact are cut or sheared from the raw stock supply. The particular time and pressure selected, subject to the aforesaid limitations will, of course, depend in large measure on the size of the article to be formed. The forming speed or speeds of movement of the die blocks may vary, illustratively, between one inch per second to 100 inches per second. It is not in this regard that the two or more component metals employed are preferably of the same body diameter; and that from the initial cutting or shearing off of the last of the wire or rod components to be invested into the product contact from stock and through the subsequent and continuous sequence of deformation and reshaping of the subject process, the rod elements are in sustained physical contact with each other. The temperature attained at the interfacial boundaries during the course of deformation and reshaping is generated by the combination of time and pressure recited above. Heating of the finished articles to cause further eutectic alloying of the component interfaces by securing compatible tensile and flow characteristics therein is also had normally. Such heating is effected normally in an inert, oxygen-free atmosphere, e.g. hydrogen, nitrogen-hydrogen, and the like.

For a fuller understanding of the nature of the present invention as well as for specific fulfilment thereof, reference should be had to the following detailed description taken in connection with the accompanying drawings.

FIGURE 1 is a sectionalized cross-section of one step in the performance of the present process. In this particular step, and those which follow and are shown in FIGURES 2, 3, 4 and 5, the operations are carried out in sequence in a planned series of steps which include and comprise coining or upsetting, piercing, extruding, forced filling of the previously pierced and/or extruded cavity with a material differing from that originally pierced and/or extruded, and the further integration of these components through upsetting, coining, reshaping and the like.

Referring now to FIGURE 1, block 10 represents one of a pair of movable die blocks and block 11 represents the second of this pair of die blocks, both controllable in motion so as to be driven towards, or away from each other in subsequent steps. Die block 11 contains a hole 12 extending throughout its main body and longitudinal with respect to movement of the die block.

An anvil or piercing tool 13 is proportioned to fit within and be driven through hole 12 to a predetermined position. A rod or wire 14 or other suitably shaped segment or section of one of the component materials to be used in making the integral assembly is shown in side view in FIGURE 1a and in front view in FIGURE 1b. Rod 14, for example, may be a solid cylindrical segment of fine silver.

FIGURE 2 shows die block 10 and die block 11 moving toward each other. Segment 14 has been inserted in hole 12 after being sheared from raw stock and is forced forward toward die block 10 by plunger 13. Segment 14 is loaded into hole 12 by a transfer and cut off mechanism similar to those conveniently found on the cold rivet upsetters, more commonly called heading machines.

FIGURE 3 shows the further closing motion of blocks 10 and 11 and also shows the further forward progress of plunger 13 which has both partially pierced segment 14 and driven it against die block 10 with sufficient force to partially upset it into body 16.

In FIGURE 4, it is shown that die block 10 has now been moved and replaced with a new recessed die block 18. This may be done by conveniently arranged cams or by methods commonly used in heading machines. Likewise plunger 13 has been similarly and substantially simultaneously withdrawn, and a cylinder 23 of a suitable material such as copper or iron is then placed within the now open portion 12 of die block 11, as left when plunger 13 was withdrawn. If desired, cylinder or segment 23 may be a cored or multi-cored cylindrical segment such as member 24 shown in side view in FIGURE 4a and in end view in FIGURE 4b and may, for example, be comprised of a copper center section and an outer plating or cladding of nickel. Member 23, of course, supplies the material that is to be clad.

In FIGURE 5, die block 11 has moved further towards recessed die block 18, and at the same time cylindrical segment 23 has been made to further enter hole 12 in die block 11, and has been further driven forward and into the cavity of the silver body shown as 20 in FIGURE 4, said cavity having previously been formed as shown in FIGURE 3 above. A driving force is then applied to segment 23 as by a plunger 9 as from the return stroke of plunger 13 whereby segment 23 is further driven forward toward die block 18 sufficiently to substantially fill the cavity of body 20; and with sufficient force to drive the previously upset head or main body portion of the silver body 20 into the recess provided in die block 18.

Continuation of the movement of die block 11 toward block 18 results in the silver body 20 being filled with the desired secondary material, e.g. copper. This is illustrated in FIGURE 6. Subsequently die blocks 18 and 11 are disengaged and die block 11 moves away sufficiently to allow ejection of the completed clad part which may be a rivet, as shown in cross-section in FIGURE 6a wherein the silver facing is clad to a copper inner body.

By properly dimensioning the component parts, and properly designing die blocks and punches, the silver cladding may be brought down only to or slightly over a portion of the rivet body and/or its shank. Typical of such results are the cross-section parts in FIGURES 7 and 8. This procedure not only provides economy in manufacture, but also overcomes the objection to a corrodible surface by having an outside sheath of non-corrodible material covering essential portions of the assembly. Where this is not a factor, parts may be produced, as shown in cross-section in FIGURE 8. Such cladding is of particular value in silver contacts to prevent or ameliorate contact resistance, voltage drop, and ultimate resistance rise at the points of physical contact between the contact body and its support mounting.

Those skilled in the art will note that the shape and relative movements of the die blocks used in forming the finished parts may be varied without departing from the scope of the invention. One variation is shown in FIGURES 9 through 13 where a solid die block 32 cooperates with a pierced die block 34 which has a space 33 recessed therein. Space 33 predetermines the final shape of the assembled part which is to be the end product and a connecting hole runs from this recess through the body of die block 34 longitudinally with respect to the movement of die block 34. FIGURE 9a is a side view and FIGURE 9b an end view of a suitably shaped segment or element 36 of the desired facing material to be received by block 34. For illustrative purposes, element 36 may be a cylindrical segment, and it may be comprised of silver. Element 37 is a plunger or piercing tool so dimensioned as to readily enter and travel through the hole connected to space 33. Die blocks 32 and 34 are so actuated as to move toward or away from each other.

In FIGURE 10, segment 36 has been positioned, and partially pushed through and beyond the hole in die block 34 by plunger 37. Segment 36 has also been partially pierced by plunger 37, and driven into physical contact with die block 32, with sufficient force to partially "head" or deform a portion 38 thereof and as shown. In FIGURE 11 it will be noted that the following sequence of operation has been effected as compared to FIGURE 10. Plunger 37 has completed its operation (see FIGURE 3) and has been withdrawn from the hole. Segment 39 of proper shape and composition and comprised, for example of copper, has been positioned and partially driven into the cavity within die block 34 and the element, e.g. silver, 36.

In FIGURE 12 the following sequence of operations has followed those shown in FIGURE 11—die blocks 32 and 34 have been brought into closer relative positions and copper segment 39 has been driven further into the guide hole, and has also substantially filled the cavity within the shank and preformed head sections of silver body 38. Silver body 38 has also been further deformed or upset against die block 32.

FIGURE 13 shows the final coining or integrating step previously outlined in FIGURES 9 through 12. It will be noted that die blocks 32 and 34 have now been brought substantially into closed position or actual physical engagement. This has further compressed or formed the silver portion 38 within the confines of recess 33 and this, in turn, has simultaneously enclosed a considerable volume of copper body 39 within the body of silver portion 38. During this folding action, a considerable amount of heat is apparently generated at the contiguous surface of 39 and 38, and since these contiguous surfaces are substantially and sufficiently free of contaminants, the combination of this high temporary heat, plus the applied pressure, together with the resulting shape assumed by each of the components 38 and 39 permanently bonds the two component materials together into one integral assembly as shown in FIGURE 14, not further separable under normal use.

A similarly effective assembly is accomplished if a cored (clad) material is used in place of a solid segment whereby the resultant contact has an intermediate surface 40 as shown in FIGURE 15.

It is to be especially noted that through use of the present invention the silver facing and the copper backing may be integrally combined into final shape in practically any desirable volumetric ratio, thus enabling economical production of finished parts in optimum materials percentages for given requirements. Thus, for example, a contact rivet can be formed having an over-all thickness of 0.025 inch or as little as 0.005 inch. Further, according to the practice herein described, there may be prepared, for example, a contact rivet having an over-all thickness of 0.025 inch and optimum ratios of thickness of contact facings of .005 inch, .010 inch and .020 inch to backings of .020 inch, .015 inch and .005 inch, respectively.

The temperature range at which the additional eutectic bonding of the component metal of the product articles is desirably effected within the practice of the invention is normally about 1000° F. to 1600° F.; this temperature being maintained for a period of from 15 minutes to 40 minutes, normally.

The table which follows illustrates the optimum conditions for effecting completion of the eutectic bonding initiated by the process described hereinabove in such commonly used and preferred metal facings for electrical contact formation as fine silver, coin silver, silver base alloys and gold and backing metals such as copper and silver; the latter being employed with a gold facing element. This additional heating step, the conditions for which are recited in this table is normally carried out for purposes of economy and efficiency, in bulk, with a plurality of assemblies or rivets prepared as described hereinabove with relation to the accompanying drawings; although it is, of course, operable with a single assembly if desired. In any event, the contact assemblies or rivets are placed in suitable containers, such as graphite, ceramic or nickel trays, which are disposed, preferably, in multilayers in a suitable heating zone, as, for example, an electrical resistance furnace; employing a suitable inert oxygen-free atmosphere, the furnace being maintained at the selected temperature for a suitable length of time to produce the desired degree of eutectic alloying.

*Table*

| Contact facing material | Rivet backing material | Temperature range, °F. | Time range, min. | Preferred atmosphere |
|---|---|---|---|---|
| Fine silver | Copper | 1,250–1,400 | 20–30 | Hydrogen. |
| Coin silver | ---do------- | 1,200–1,250 | 30–40 | Do. |
| 75% silver-25% copper | ---do------- | 1,100–1,200 | 30–40 | Do. |
| 97% silver-3% palladium | ---do------- | 1,350–1,400 | 30 | Nitrogen-helium. |
| 24K gold | Silver | 1,350–1,400 | 15 | Hydrogen. |
| 50% silver-50% copper | Copper | 1,300–1,350 | 25 | Nitrogen-hydrogen. |
| 80% silver-20% tungsten | ---do------- | 1,450–1,500 | 30 | Hydrogen. |

A further improvement obtained from this invention is that the component materials may vary widely not only in composition but in ductility, hardness, density, purity and other physical characteristics and still be satisfactorily assembled and integrally united by entirely automatic processing, whereas prior art contacts and other like clad assemblies require considerable manual and semi-manual operations.

A still further improvement obtainable through this invention is the fact that it is possible to obtain permanent union of the component materials into an integral final form characterized by an interlocking and union without the necessity for the special cleaning, skiving, or scarifying of the surfaces to be integrated as is required by prior art cold bonding practices.

While this invention has been described in connection with fabrication of electrical contacting bodies having a working face of one material and a body of one or more materials, it is evident that the invention may also produce certain beneficial results when used on either solid, multilayer or cored materials or combinations of these.

Although this invention has been described with respect to its preferred embodiments, it should be understood that many variations and modifications will now be obvious to those skilled in the art, and it is preferred, therefore, that the scope of this invention be limited not by the specific disclosure herein but only by the appended claims.

What is claimed is:

1. The method of making electrical make and break contact bodies which comprises cutting the material for the contact face from raw stock and enclosing said material in a confining medium, piercing and reshaping the contact face material while contained within said confining medium, thereby producing a suitable recess or cavity in the body of the contact face material, cutting and pressing a second contact component material from raw stock into the previously formed body cavity of the first component working face material so as to essentially encase the second material within the body of the first material, and then, within a period of not longer than two seconds after the cutting of said second contact component, forcing the two positioned component parts together with a pressure of at least 2,000 pounds per square inch, thereby effecting interfacial bonding and alloying of the abutting surfaces thereof to form the desired integrated contact body, at least a portion of said first component working face material defining an enlarged contact head including the desired contact working face.

2. The method of integrally uniting an electrical contact composed of a facing material component constituted of a material selected from the group consisting of silver, gold and alloys thereof, and a contact support component constituted of a material selected from the group consisting of copper and silver, comprising the steps of cutting the first, facing material component from raw stock and placing said component within a container, cutting the second, contact support component from stock and placing said second component also within said container so that the second component is positioned to abut the first component, and to lie on a common support axis with respect to the first component, forcing the second component into the body of the first component so as to unite the two components and forming these united components into the desired ultimate finished shape, by application of a pressure of at least 2000 pounds per square inch thereto and within a period of not longer than two seconds from the time of cutting of said second component; thereby effecting interfacial bonding and alloying of the abutting metallic surfaces of said components to thereby form the integrally united electrical contact, at least a portion of said facing material component defining an enlarged contact head including the desired contact working face.

3. The method of claim 2 in which the resulting composite content is subsequently heat treated at a temperature of 1000° F. to 1600° F.

4. The method of forming a unitary electrical contact comprising the steps of cutting a first body from raw stock and applying a plunger thereto to pass said first body through a first die and into a second die spaced from said first die whereby said plunger forms an opening in one end of said first body and the other end of said first body is enlarged by pressing against said second die, and thereafter removing said plunger and cutting a second body from raw stock, pressing said second body into said opening in said first body while exerting a pressure of at least 2000 pounds per square inch on said bodies to cause a portion of said second body to flow into said enlarged portion of said first body and effect an interfacial bonding and alloying between the abutting surfaces of said first and second bodies by moving said first and second dies toward one another; said bonding and alloying occurring within a period not longer than 2 seconds after cutting of said second body from stock; and heating the resulting electrical contact to a temperature of 1000° F. ot 1600° F. to complete the eutectic bonding of said first and second bodies therein.

References Cited by the Examiner

UNITED STATES PATENTS

| 1,672,706 | 6/28 | Brown | 29—155.55 |
| 1,826,542 | 10/31 | Hervig et al. | 29—156.7 X |
| 1,826,543 | 10/31 | Hervig et al. | 29—156.7 X |
| 1,826,549 | 10/31 | Jardine | 29—156.7 |
| 2,586,336 | 2/52 | Huck | 29—552.4 X |
| 2,739,369 | 3/56 | Cooney | 29—497.5 X |
| 2,877,147 | 3/59 | Thurmond | 148—1.5 |
| 3,106,013 | 10/63 | Rozmus | 29—482 |

OTHER REFERENCES

Constitution of Binary Alloys (Hansen), published by McGraw-Hill Book Co. (New York), 1958 (page 18, FIG. 11).

WHITMORE A. WILTZ, *Primary Examiner.*

JOHN F. CAMPBELL, *Examiner.*